UNITED STATES PATENT OFFICE.

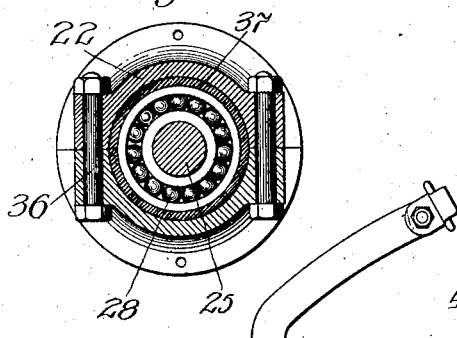
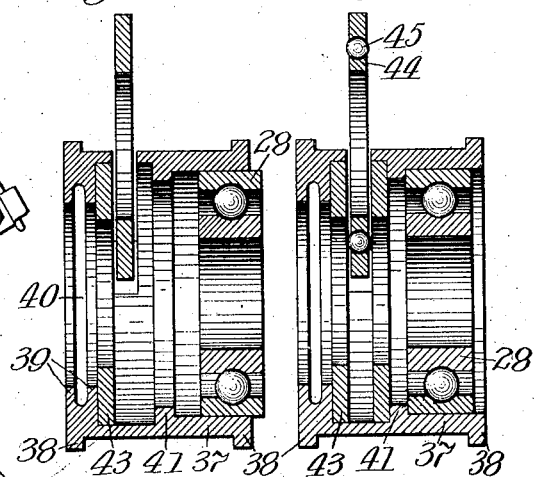
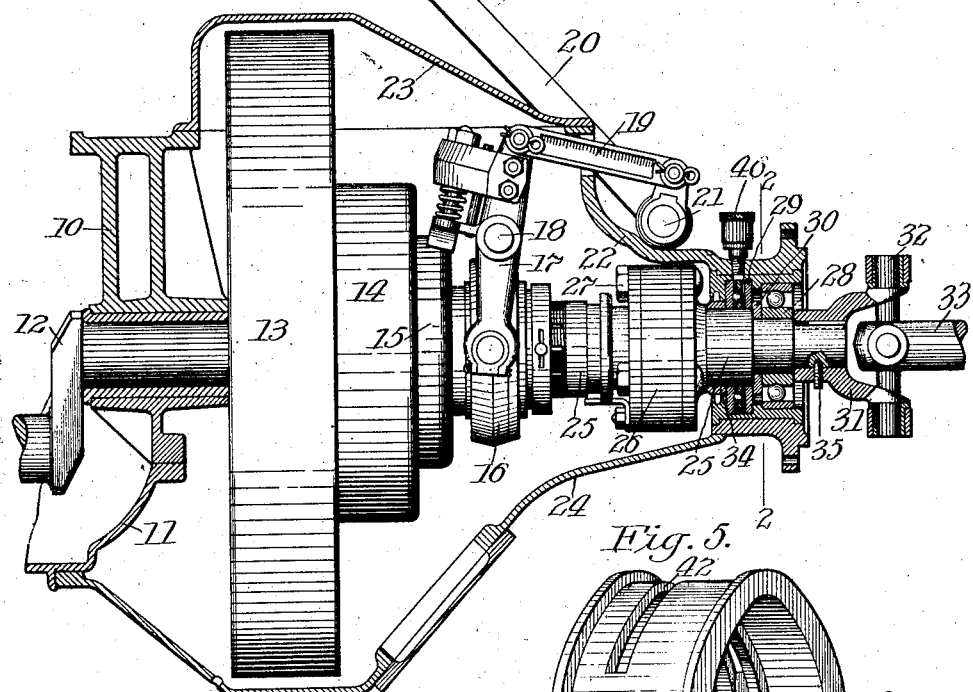
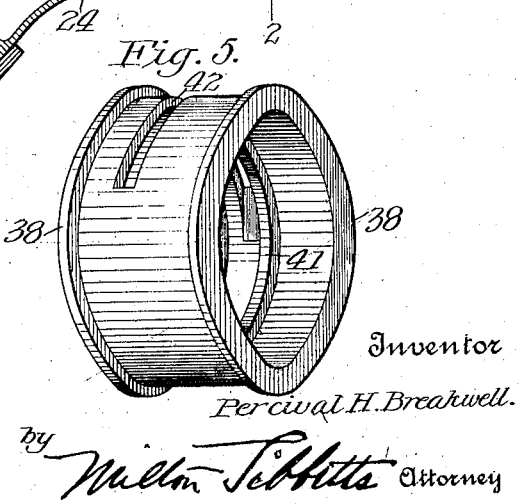

PERCIVAL H. BREAKWELL, OF PHILADELPHIA, PENNSYLVANIA, ASSIGNOR TO PACKARD MOTOR CAR COMPANY, OF DETROIT, MICHIGAN, A CORPORATION OF MICHIGAN.

BEARING AND SUPPORT THEREFOR.

1,058,717.  Specification of Letters Patent.  Patented Apr. 15, 1913.

Application filed January 26, 1912. Serial No. 673,644.

*To all whom it may concern:*

Be it known that I, PERCIVAL H. BREAKWELL, a citizen of the United States, and resident of Philadelphia, Philadelphia county, State of Pennsylvania, have invented certain new and useful Improvements in Bearings and Supports Therefor, of which the following is a specification.

This invention relates to bearings and supports therefor, and particularly to such bearings and supports as are employed in clutches for motor vehicles.

The invention is illustrated herein as applied to the rear clutch bearing of a combined motor and clutch casing.

An object of the present invention is to produce an anti-friction or ball bearing adapted to take radial and double thrust loads combined with a container of such form that it will hold the bearings in proper relation to the shaft which the bearings support, while at the same time being firmly clamped to a supporting member.

Another object of the invention is to produce such a bearing and container as above described, while at the same time providing means for easily and quickly assembling and removing the bearings.

Referring to the drawings: Figure 1 is a vertical longitudinal sectional view of the rear end of a motor crank case and the integral extension thereof which supports a clutch, the clutch and fly-wheel of the motor being shown in elevation; Fig. 2 is a section on the line 2—2 of Fig. 1; Figs. 3 and 4 are longitudinal sectional views of the radial and thrust bearings and their container showing the bearings in process of assembling in the container; Fig. 5 is a perspective view of the container.

Heretofore where a container has been provided for a thrust bearing that is adapted to take thrust in both directions the container either has been split longitudinally in order to take the thrust disks and ball retainer or it has been provided with a ring screwed into the interior of the container for securing the thrust bearing between it and the interior flange. The first of these constructions is objectionable in that the two parts of the container, in being clamped to a support are sometimes shifted relative to each other making an "out-of-round" sleeve; while the latter of said constructions is objectionable in that the thrust in one direction is necessarily taken upon the threads of the ring.

The present invention provides a container for a radial and a thrust bearing, which container is not split longitudinally and has no threaded parts whatever. The radial bearing is suitably disposed therein and the double thrust bearing is inserted between two separated interior flanges through a transverse slot formed in the container. The manner of assembling the parts of the bearings will be hereinafter described.

The bearings and container above briefly referred to are shown as forming the rear clutch bearing of a motor and clutch casing, and the invention as so employed will now be described in detail.

Referring to the drawings, 10 represents the rear portion of the crank case of an internal combustion motor adapted for motor vehicle use, and 11 is the bottom cover of this crank case.

12 is the motor crank shaft, and 13 is the flywheel of the motor upon which is secured the clutch drum 14.

The clutch may be of any desired type, the one shown being of the multiple disk variety. The inner or movable part of the clutch is shown at 15 and it is operated axially by the collar 16, yoke 17 pivoted at 18, link 19 and pedal lever 20 pivoted at 21 on the casing 22, which casing is formed as an extension of the motor crank case 10, and together with the top cover 23 and lower cover 24 forms a housing for the clutch and flywheel. The clutch shaft 25 is formed in two parts joined by the connecting block 26 and bolts 27, the block being inserted between these two parts to separate them after the clutch is inserted in the casing. By the removal of this block the forward part of the clutch shaft may be moved rearwardly with the clutch and the latter removed from the casing. The clutch shaft 25 is supported in a radial bearing 28 and a thrust bearing 29, which latter is of the type that takes thrust in both directions. The inner race of the radial bearing 28 is secured to the shaft 25 between ring 30 and yoke 31 of universal joint 32, which latter connects the shaft 25 with the propeller shaft 33. The ring 30 abuts against a shoulder on the shaft 25 and the thrust bearing 29 is secured between this ring and another ring 34, which abuts against another shoulder on the shaft 25. The yoke 31 above referred to is secured to the shaft 25 by a key as shown and by a lock screw 35.

The rear end of the casing 22 is formed with an opening through which the shaft 25 extends, and this part of the casing is split longitudinally and the upper and lower halves are bolted together by bolts 36, this construction being well shown in Figs. 1 and 2.

The container 37 for the radial and thrust bearings comprises a single piece sleeve formed with external annular flanges 38 at its ends so that when it is clamped between the upper and lower parts of the casing 22 it can have no movement axially. This, of course, is for the purpose of taking the thrust of the shaft 25 in both directions. This container 37 is provided interiorly with a double flange 39, which when assembled immediately surrounds the ring 34 on the shaft 25, and suitable packing material may be placed in the groove 40 formed in this flange 39 for the purpose of retaining lubricant in the bearings. Separated from the flange 39 in the container is a flange 41 and between these flanges is an annular space adapted to contain the three parts of the thrust bearing 29, which thrust bearing is adapted to be assembled in said space, one of its parts at a time, through a slot 42 cut transversely in the container 37 approximately midway between the flanges 39 and 41. The total length of this slot is approximately the interior diameter of the container 37 between the flanges 39 and 41.

The thrust bearing 29 is composed of two thrust disks 43 and a ball retaining disk 44 adapted to be assembled between the disks 43. The thrust disks 43 are preferably about as thick as the diameter of the balls 45 in the ball retainer 44, the slot 42 is approximately the width of the diameter of said balls, and the space between the flanges 39 and 41 is adapted to take the complete thrust bearing. With these proportions it will be evident upon reference to the drawings, and particularly to Figs. 3 and 4, that one of the disks 43 may be inserted through the slot 42 and positioned as shown in Fig. 3, the second disk 43 may then be positioned as shown in Fig. 4, and the ball retaining disk may then be inserted through the slot 42 between the two disks 43. If the container 37 is then clamped between the upper and lower parts of the casing 22, there is of course no chance for the various parts of the thrust bearing to drop out.

The radial bearing 28 is of the usual ball type, having inner and outer race rings with balls between them and the container 37 is formed interiorly at one end to take the outer race of said bearing 28, the bearing being assembled in the container as shown in Figs. 3 and 4.

The bearings may be lubricated by means of a grease or oil cup 46 arranged in the casing 22 directly above the slot 42 so that grease or oil from this cup will reach the bearings through said slot.

Having thus described my invention, what I claim is:

1. The combination with a thrust bearing comprising a ball retaining disk with balls therein and a thrust disk, of a container for said bearing comprising a sleeve having a transverse entrance slot therein for said disks.

2. The combination with a thrust bearing comprising a ball retaining disk with balls therein and a thrust disk, of a container for said bearing comprising a sleeve having a pair of separated internal flanges and a transverse slot between the flanges for the entrance of said disks.

3. The combination with a thrust bearing comprising a ball retaining disk with balls therein and a pair of thrust disks, of a container for said bearing comprising a sleeve having separated internal flanges and a transverse slot midway between said flanges adapted to permit the entrance singly of said disks.

4. The combination with a bearing, of a container therefor comprising a sleeve having a transverse entrance slot for said bearing, and a two-part support for said container adapted to be secured together around the container.

5. The combination with a bearing, of a container therefor comprising a sleeve having a transverse entrance slot for said bearing, a support for said container surrounding the latter, and a grease cup in said support adapted to deliver lubricant to said bearing through said entrance slot.

In testimony whereof I affix my signature in the presence of two witnesses.

PERCIVAL H. BREAKWELL.

Witnesses:
　E. LAURENCE WEBSTER,
　C. G. CULVER.